US006927276B2

(12) United States Patent
Medsker et al.

(10) Patent No.: US 6,927,276 B2
(45) Date of Patent: Aug. 9, 2005

(54) MONOHYDRIC POLYFLUOROOXETANE OLIGOMERS, POLYMERS, AND COPOLYMERS AND COATING CONTAINING THE SAME

(75) Inventors: Robert Medsker, Hartville, OH (US); Gary L. Jialanella, Stow, OH (US); Raymond J. Weinert, Macedonia, OH (US); Guillermina C. Garcia, Copley, OH (US); Aslam Malik, Cameron Park, CA (US); Roland Carlson, Folsom, CA (US)

(73) Assignee: OMNOVA Solutions Inc., Fairlawn, OH (US)

( * ) Notice: Subject to any disclaimer, the term of this patent is extended or adjusted under 35 U.S.C. 154(b) by 67 days.

(21) Appl. No.: 10/316,412

(22) Filed: Dec. 11, 2002

(65) Prior Publication Data

US 2003/0149186 A1 Aug. 7, 2003

Related U.S. Application Data

(60) Division of application No. 09/727,637, filed on Dec. 1, 2000, which is a continuation-in-part of application No. 09/473,518, filed on Dec. 28, 1999, now Pat. No. 6,403,760.

(51) Int. Cl.[7] .............................................. C08G 65/22
(52) U.S. Cl. ........................... 528/402; 528/70; 528/76; 528/80; 528/85; 525/410; 525/453; 525/460; 526/242
(58) Field of Search ............................ 528/402, 70, 76, 528/80, 85, 414, 415, 416, 417; 525/410, 453, 460; 526/242; 549/511; 568/615

(56) References Cited

U.S. PATENT DOCUMENTS

| 3,100,722 | A | 8/1963 | Hermann et al. |
| 3,834,823 | A | 9/1974 | Seregely et al. |
| 3,922,457 | A | 11/1975 | Barnwell et al. |
| 3,949,132 | A | 4/1976 | Seregely et al. |
| 4,051,195 | A | 9/1977 | McWhorter |
| 4,118,541 | A | 10/1978 | Power et al. |
| 4,603,074 | A | 7/1986 | Pate et al. |
| 4,686,275 | A | 8/1987 | Bryant et al. |
| 4,746,576 | A | 5/1988 | Ozu et al. |
| 4,857,396 | A | 8/1989 | Otonari et al. |
| 4,898,981 | A | 2/1990 | Falk et al. |
| 4,946,992 | A | 8/1990 | Falk et al. |
| 4,988,123 | A | 1/1991 | Lin et al. |
| 4,988,797 | A | 1/1991 | Wardle et al. |
| 5,021,544 | A | 6/1991 | Padget et al. |
| 5,025,052 | A | 6/1991 | Crater et al. |
| 5,043,221 | A | 8/1991 | Koleske |
| 5,045,624 | A | 9/1991 | Falk et al. |
| 5,097,048 | A | 3/1992 | Falk et al. |
| 5,099,026 | A | 3/1992 | Crater et al. |
| 5,210,179 | A | 5/1993 | Stewart |
| 5,230,954 | A | 7/1993 | Sakamoto et al. |
| 5,324,764 | A | 6/1994 | Fujita et al. |
| 5,361,164 | A | 11/1994 | Steliga |
| 5,543,200 | A | 8/1996 | Hargis et al. |
| 5,576,095 | A | 11/1996 | Ueda et al. |
| 5,637,657 | A | 6/1997 | Anton |
| 5,637,772 | A | 6/1997 | Malik et al. |
| 5,641,853 | A | 6/1997 | Drysdale |
| 5,649,828 | A | 7/1997 | Kawashima |
| 5,650,483 | A | 7/1997 | Malik et al. |

(Continued)

FOREIGN PATENT DOCUMENTS

| EP | 348 350 | 12/1989 |
| EP | 430 887 | 6/1991 |
| JP | 63105029 | 5/1988 |
| WO | WO 96/18699 | 6/1996 |
| WO | WO 96/21657 | 7/1996 |
| WO | WO 96/23828 | 8/1996 |
| WO | WO 99/26992 | 6/1999 |
| WO | WO 99/45079 | 9/1999 |
| WO | WO 00/46270 | 8/2000 |

OTHER PUBLICATIONS 10 pages of World Patent Index search results based on PVC and fluoro . . . coating.
4 pages of World Patent Index search results based on PVC and polyester coating.
40 pages of Chemical Abstract search results based on PVC and fluoro . . . coating.
25 pages of Chemical Abstract search results based on PVC and polyester.
CA entries and Derwent patent family printouts on JP 03275859; JP 04363370; JP 07004064; JP 07039812; JP 08283654; JP 6216941; and JP 63248827.
Letter to Southwest Texas Distributions, Inc. dated Mar. 5, 1998 to Greg Nemes from Barry Bastion, Product Manager, GenCorp with invoice to Southwest Texas Distributions, Inc. dated Apr. 9, 1998, from GenCorp.

*Primary Examiner*—Tatyana Zalukaeva
(74) *Attorney, Agent, or Firm*—Renner, Kenner, Greive, Bobak, Taylor & Weber

(57) ABSTRACT

Monofunctional polyfluorooxetane oligomers, polymers, and copolymers are prepared by the cationic polymerization of fluorooxetane monomers with a monoalcohol. In addition to serving as an initiator, the monoalcohol can also serve as a solvent for the fluorooxetane or other monomers to produce oligomers, polymers, or copolymers having low cyclic content. Suitable comonomers generally include various cyclic ethers. The polyfluorooxetane oligomer, polymer, or copolymer having a single hydroxyl end group can be functionalized with a variety of compounds so as to yield a functional end group such as an acrylate, a methacrylate, an allylic, an amine, etc., with the functionalized oligomer or polymer being suitable for use in radiation curable or thermal curable coating compositions. These functionalized polymers can be copolymerized and cured to provide improvements in wetting and surface properties.

9 Claims, No Drawings

U.S. PATENT DOCUMENTS

| | | |
|---|---|---|
| 5,654,450 A | 8/1997 | Malik et al. |
| 5,663,289 A | 9/1997 | Archibald et al. |
| 5,668,250 A | 9/1997 | Malik et al. |
| 5,668,251 A | 9/1997 | Malik et al. |
| 5,672,651 A | 9/1997 | Smith |
| 5,674,951 A | 10/1997 | Hargis et al. |
| 5,681,890 A | 10/1997 | Tanaka et al. |
| 5,703,194 A | 12/1997 | Malik et al. |
| 5,798,402 A | 8/1998 | Fitzgerald et al. |
| 5,807,977 A | 9/1998 | Malik et al. |
| 6,037,483 A | 3/2000 | Malik et al. |
| 6,040,419 A | 3/2000 | Drysdale et al. |
| 6,168,866 B1 | 1/2001 | Clark |
| 6,239,247 B1 | 5/2001 | Allewaert et al. |
| 6,380,351 B1 * | 4/2002 | Malik et al. ............... 528/402 |
| 6,417,314 B1 * | 7/2002 | Malik et al. ............... 528/60 |
| 6,436,540 B1 * | 8/2002 | Garcia et al. ............ 428/423.1 |
| 6,448,368 B1 * | 9/2002 | Malik et al. ............... 528/402 |
| 6,465,566 B2 * | 10/2002 | Garcia et al. ............... 524/591 |
| 6,479,623 B1 | 11/2002 | Malik et al. |
| 6,660,828 B2 * | 12/2003 | Thomas et al. ............ 528/402 |
| 6,686,051 B1 * | 2/2004 | Weinert et al. ............ 428/458 |
| 6,727,344 B2 * | 4/2004 | Weinert et al. ............ 528/402 |

* cited by examiner

MONOHYDRIC POLYFLUOROOXETANE OLIGOMERS, POLYMERS, AND COPOLYMERS AND COATING CONTAINING THE SAME

CROSS REFERENCE

This application is a continuation-in-part of prior application Ser. No. 09/473,518, filed Dec. 28, 1999, entitled A Monohydric Polyfluorooxetane Polymer and Radiation Curable Coatings Containing A Monofunctional Polyfluorooxetane Polymer now U.S. Pat. No. 6,403,760, which is herein incorporated by reference. This Application is a division of prior application Ser. No. 09/727,637 filed Dec. 1, 2000, now allowed.

FIELD OF INVENTION

The present invention relates to monohydroxyl polyfluorooxetane oligomers, polymers, and copolymers. The present invention further relates to radiation or thermal curable coatings made from functionalized polyfluorooxetane oligomers or polymers.

BACKGROUND OF THE INVENTION

Traditionally radiation or thermal curable coatings utilized combinations of silicone oils, wetting agents and polyethylene waxes to provide smoothness, abrasion resistance, low friction and scratch resistance. However these materials can be largely fugitive in nature and thus migratory leading to handling problems, lowering durability, and possibly working at cross-purposes leading to decreases in other coating properties such as gloss.

U.S. Pat. No. 5,411,996 disclosed the use of fluoroalcohol in U.V. epoxy-silicone coating formulations. The fluorinated alcohols were used to solubilize the U.V. initiator (sulfonium salt) to allow the polymerization reaction to occur.

U.S. Pat. No. 5,081,165 related to an anti-fouling coating composition comprising a photopolymerization initiator or thermal polymerization initiator and fluorine containing (meth)acrylate.

U.S. Pat. No. 4,833,207 relates to a curable composition for forming a cladding for an optical fiber having a refractive index of about 1.43 to 1.60.

U.S. Pat. No. 5,674,951 discloses isocyanate functionalized polyoxetane polymers with pendant fluorinated side chains that can optionally be chain extended with polyoxetanes or other polyethers, have the isocyanate group blocked, and be crosslinked into a network. These coatings were effective for glass run channels.

SUMMARY OF THE INVENTION

A monoalcohol initiator is reacted with a fluorooxetane monomer to produce a monohydroxyl polyfluorooxetane oligomer, polymer, or copolymer composition by utilizing a cationic catalyst and optional comonomer. If the monoalcohol initiator is also utilized as a solvent which is then a co-initiator for the fluorooxetane monomers, linear oligomers, polymers, and copolymers are produced having low cyclic content. The oligomers, polymers, or copolymers can be functionalized with various end groups and thereafter used in a radiation or thermal curable coating composition.

Generally, the oligomer or polymer or copolymer can contain various reactive functional groups such as acrylate, methacrylate, allylic, melamine, amine, epoxide, silyl, isocyanate, acetyl acetate, and the like. The fluorinated oxetane repeating units can have a single pendant fluorinated side group per repeating unit or they can have two pendant fluorinated side groups per repeating unit. Coating composition comprises the functionalized polyfluorooxetane oligomer, polymer, or copolymer, optional UV initiator, crosslinking agents, and coating oligomers, polymers or copolymers, as well as optionally other additives such as pigments, plasticizers, rheology modifiers etc. The coating composition can be cured by radiation or heat.

The functionalized polyfluorooxetane can be produced by various methods such as by directly reacting the hydroxyl groups of the polyfluorooxetane with a compound containing the desired functional group. Alternatively, but less desired, a functionalized polyfluorooxetane is first formed by utilizing a coupling compound such as a polyisocyanate, or a diepoxy, or a diacid and subsequently reacting the same with a compound containing a functional group which will yield a functionalized polyfluorooxetane having intervening urethane linkages or linkages derived from the epoxy compound or the diacid. Alternatively, the functionalizing compound can be reacted with the coupling compound (e.g. epoxy, isocyanate or acid) and the resulting compound then reacted with the polyfluorooxetane.

DETAILED DESCRIPTION OF THE INVENTION

Generally, any type of monoalcohol can be utilized to produce the monohydroxyl polyfluorooxetane (MOX) oligomer, polymer, or copolymer composition of the present invention. Suitable monoalcohols generally include organic alcohols having from 1 to about 40 and preferably from about 1 to about 18 carbon atoms; polymeric alcohols; or tetrafluoroethylene based telomer alcohols. Examples of specific types of monohydric organic alcohols include the various aliphatic, aromatic, etc. alcohols such as alkyl alcohols, for example methyl alcohol, ethyl alcohol, propyl alcohol, etc., or the olefinic alcohols, for example allyl alcohol, etc. or the alicyclic alcohols, for example, cyclohexanol, etc. or the heterocyclic alcohols, for example furfuryl alcohol, etc. Various aromatic alcohols include benzyl alcohol, and the like. Moreover, halogenated organic alcohols and especially fluoroalcohols having from 2 to 18 carbon atoms are desired such as trifluoroethanol, heptafluorobutanol, heptadecylfluorooctanol, and the like. Especially preferred monohydric alcohols include benzyl alcohol, trifluoroethanol, heptafluorobutanol, pentafluoropropanol, pentafluorobutanol, nonafluorohexanol, various perfluoroalkylethanols, and allyl alcohol.

The polymeric alcohols are generally made from alkylene oxides having from 2 to 6 carbon atoms with 2 or 3 carbon atoms, that is ethylene oxide, propylene oxide, or tetrahydrofuran, or copolymers thereof being preferred. The number of repeat units of the polymeric alcohols can generally range from about 2 to about 50, desirably from about 3 to about 30 with from about 5 to 20 repeat units being preferred.

Another group of monoalcohols are the various tetrafluoroethylene based telomer fluoroalcohols such as those commercially available from Dupont as Zonyl, from Clarion as Fluowet, from Elf-Atochem as Foralkyl 6HN, and the like. Such fluoroalcohols have the general formula $CF_3CF_2(CF_2CF_2)_xCH_2CH_2OH$ where x is generally an integer of from 1 to about 19 and preferably from about 8 to about 12. While some of the fluoroalcohols are crystalline or solid at room temperature all are melted at temperatures of about 40° C.

While a monohydric alcohol can be utilized as an initiator in combination with a solvent, it is a preferred embodiment of the present invention to utilize a monohydric alcohol which serves as both an initiator as well as a solvent for the fluorooxetane monomers and the like. In other words, it is preferred that a solvent not be utilized other than a monoalcohol which can also function as a solvent in that it solubilizers the below noted oxetane monomers. Such co-initiator-solvent alcohols are desired inasmuch as they produce linear low molecular weight polyfluorooxetane oligomers, polymers, or copolymers and most preferably oligomeric dimers, trimers, and tetramers having low cyclic content. Such co-initiator-solvents include generally any of the above noted monoalcohols which solubilize the oxetane monomers with preferred alcohols including trifluoroethanol, benzyl alcohol, allyl alcohol, heptafluorbutanol, pentafluoropropanol, pentafluorobutanol, nonafluorohexanol, various perfluoroalkylethanols, and the like. The use of such co-initiator-solvent monoalcohols generally produces linear oligomers having less than about 10%, desirably less than about 8%, and preferably less than about 5%, or 3%, or 2%, or less than about 1% by weight of cyclic oligomers based upon the total weight of generally the oligomers, and also any polymers, or copolymers if the same are also produced. Similarly, if a polymer is produced, desirably the amount of cyclic oligomer produced is low, i.e. the same values as set forth immediately above, based upon the total weight of the polymers, and any oligomers, or copolymers produced. In the same manner, if copolymers are produced, the amount of cyclic oligomers is low based upon the total weight of the copolymer, and any oligomer or polymer which also may be inherently produced. Oligomers generally have a Dp of from about 2 to about 20 with polymers generally having a higher Dp.

Although solvents are preferably not utilized in order to produce oligomers, polymers or copolymers having low cyclic oligomer content, it is to be understood that low amounts of non-initiator solvents might be utilized such as generally less than 25% or 15% and preferably less than 10%, 5%, 3% or nil by weight based upon the total weight of the small amount of non-initiator solvent utilized and the monoalcohol.

The oxetane monomer used to form the polyfluorooxetane has the structure

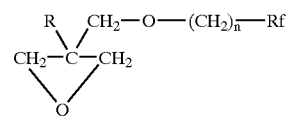

IA or

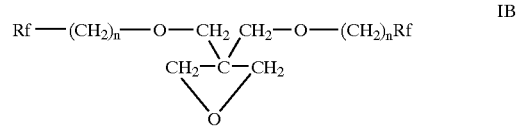

IB where R, Rf, and n are as set forth herein below.
The above oxetane monomers can be made in a manner as set forth in U.S. Pat. Nos. 5,650,483; 5,668,250; 5,668,251; and 5,663,289, hereby fully incorporated by reference with regard to all aspects thereof.

Preparation of Mono and Bis(Fluorooxetane) Monomers

While the following representative examples relate to the preparation of specific FOX (fluorooxetane) monomers, (i.e. mono 3-FOX, mono 7-FOX, and bis (6-FOX) other mono or bis FOX monomers can be prepared in a very similar manner.

EXAMPLE M1

Preparation of 3-FOX Monomer 3-(2,2,2-Trifluoroethoxymethyl)-3-Methyloxetane

Synthesis of the 3-FOX oxetane monomer is performed as follows:

A dispersion of 50 weight percent (2.8 grams, 58.3 mmol) sodium hydride in mineral oil, was washed twice with hexanes and suspended in 35 milliliters of dimethyl formamide. Then, 5.2 grams (52 mmol) of trifluoroethanol was added and the mixture was stirred for 45 minutes. A solution of 10.0 grams (39 mmol) of 3-hydroxymethyl-3-methyloxetane p-toluenesulfonate in 15 milliliters of dimethyl formamide was added and the mixture was heated at 75°–85° C. for 20 hours, when $^1H$ MNR analysis of an aliquot sample showed that the starting sulfonate had been consumed.

The mixture was poured into 100 milliliters of ice water and extracted with 2 volumes of methylene chloride. The combined organic extracts were washed twice with water, twice with 2 weight percent aqueous hydrochloric acid, brine, dried over magnesium sulfate, and evaporated to give 6.5 grams of 3-(2,2,2-trifluoroethoxymethyl)-3-methyloxetane as an oil containing less than 1 weight percent dimethyl formamide. The yield of this product was 90 percent. The oil was distilled at 30° C. and 0.2 millimeters mercury pressure to give 4.3 grams of analytically pure 3-FOX, corresponding to a 60 percent yield. The analyses of the product were as follows: IR (KBr) 2960–2880, 1360 –1080, 990, 840 cm$^{-1}$; $^1H$ NMR δ 1.33 (s, 3H), 3.65 (s, 2H), 3.86 (q, J=8.8 Hz, 2H), 4.35 (d, J=5.6 Hz, 2H), 4.51 (d, J=5.6 Hz, 2H); $^{13}C$ NMR δ 20.72, 39.74, 68.38 (q, J=40 Hz), 77.63, 79.41, 124 (q, J=272 Hz). The calculated elemental analysis for $C_7H_{11}F_3O_2$ is: C=45.65; H=6.02; F=30.95. The experimental analysis found: C=45.28; H=5.83; F=30.59.

EXAMPLE M2

Preparation of 7-FOX Using PTC Process 3-(2,2,3,3,4,4,4-Heptafluorobutoxymethyl)-3-Methyloxetane A 2 L, 3 necked round bottom flask fitted with a reflux condenser, a mechanical stirrer, a digital thermometer and an addition funnel was charged with 3-bromomethyl-3-methyloxetane (351.5 g, 2.13 mol), heptafluorobutan-1-ol (426.7 g, 2.13 mol), tetrabutylammonium bromide (34.4 g) and water (85 ml). The mixture was stirred and heated to 75° C. Next, a solution of potassium hydroxide (158 g, 87% pure, 2.45 mol) in water (200 ml) was added and the mixture was stirred vigorously at 80°–85° C. for 4 hours. The progress of the reaction was monitored by GLC and when GLC analysis revealed that the starting materials were consumed, the heat was removed and the mixture was cooled to room temperature. The reaction mixture was diluted with water and the organic layer was separated and washed with water, dried and filtered to give 566 g (94%) of crude product. The crude product was transferred to a distillation flask fitted with a 6 inch column and distilled as follows:

Fraction #1, boiling between 20° C.–23° C./10 mm-Hg, was found to be a mixture of heptafluorobutanol and other low boiling impurities, was discarded;

Fraction #2, boiling between 23° C. and 75° C./1 mm-Hg, was found to be a mixture of heptafluorobutanol and 7-FOX, was also discarded; and Fraction #3, boiling at 75° C./1 mm-Hg was >99% pure 7-FOX representing an overall yield of 80.2%

NMR and GLC data revealed that 7-FOX produced by this method was identical to 7-FOX prepared using the sodium hydride/DMF process.

Examples M3 and M4 relate to the preparation and properties of 3,3-bis(2,2,2-trifluoroethoyxmethyl)oxetane (B6-FOX) using two different procedures.

EXAMPLE M3

Procedure A

Sodium hydride (50% dispersion in mineral oil, 18.4 g, 0.383 mol) was washed with hexanes (2×) and was suspended in DMF (200 mL). Then trifluoroethanol (38.3 g, 0.383 mol) was added dropwise over 45 min while hydrogen gas was evolved. The mixture was stirred for 30 min and a solution of 3,3-bis-(hydroxymethyl)oxetane di-p-toluenesulfonate (30.0 g, 0.073 mol) in DMF (50 mL) was added. The mixture was heated to 75° C. for 64 h when $^1$H NMR analysis of an aliquot showed that the starting sulfonate had been consumed. The mixture was poured into water and extracted with methylene chloride (2×). The combined organic extracts were washed with brine, 2% aqueous HCl, water, dried (MgSO4), and evaporated to give 17.5 g (100%) of 3,3-bis-(2,2,2-trifluoroethoxymethyl)oxetane as an oil containing DMF (<1%). The oil was purified by bulb-to-bulb distillation at 42–48° C. (0.1 mm) to give 15.6 g (79%) of analytically pure B6-FOX, colorless oil: IR (KBr) 2960–2880, 1360–1080, 995, 840 cm$^{-1}$; $^1$H NMR δ 3.87 (s 4H), 3.87 (q, J=8.8 Hz, 4H), 4.46 (s, 4H); $^{13}$C NMR δ 43.69, 68.62 (q, J=35 Hz), 73.15, 75.59, 123.87 (q, J=275 Hz); $^{19}$F NMR δ −74.6 (s). Anal. Calcd, for $C_9H_{12}F_6O_3$; C, 38.31; H, 4.29; F, 40.40. Found: C, 38.30; H, 4.30; F, 40.19.

EXAMPLE M4

Procedure B

A 2 L round-bottom flask fitted with a mechanical stirrer, condenser and a thermometer was charged with 3,3-bis-(bromomethyl)oxetane (300 g, 1.2 mol), trifluoroethanol (284 g, 2.8 mol), tetrabutylammonium bromide (39.9 g, 0.12 mol) and water (265 mL). The mixture was heated to 85° C. and a 50% aqueous potassium hydroxide solution (672 g, 5.1 mol) was added via an additional funnel over a period of 3 h. The progress of the reaction was monitored by GLC and when greater than 99% of 3,3-bis-(bromomethyl)oxetane was consumed, the reaction mixture was cooled to room temperature and diluted with water (500 mL). The organic phase was separated and washed with 2% aqueous potassium hydroxide solution (500 mL) and water (500 mL). The crude product was then distilled under reduced pressure (bp=103° C./5 mm/Hg) to give 278 g (80% of greater than 99% pure (GLC) 3,3-bis(-2,2,2-trifluoroethoxymethyl)oxetane, a colorless oil. Spectral analysis revealed that the product prepared by this process was identical with B6-FOX monomer prepared by Procedure A.

The repeating unit derived from the above oxetane monomers IA and IB have the formula

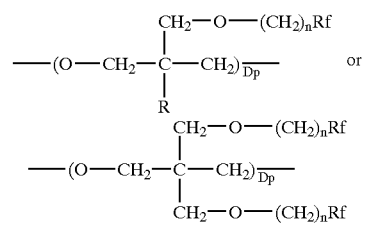

where each n is the same or different and independently, is an integer of from 1 to about 5 or 6 and desirably from 1 to about 3, R is hydrogen or an alkyl of 1 to 6 carbon atoms and desirably methyl or ethyl, and each Rf is the same or different and independently on each repeat unit is a linear or branched fluorinated alkyl of 1 to about 20 carbon atoms, desirably 1 to about 15, and preferably from 1 to about 8, a minimum of 25, 50, 75, 85, or 95 percent of the non-carbon atoms of the alkyl being fluorine atoms and optionally the remaining non-carbon atoms being H, I, Cl, or Br; or each Rf is the same or different and individually is a perfluorinated polyether having from 4 to 60 carbon atoms.

Generally any suitable cationic catalyst can be utilized to polymerize the fluorooxetane monomers such as various Lewis acids and complexes thereof. Examples of such Lewis acid catalysts include Sn(IV)Cl$_4$, antimony pentafluoride, phosphorous pentafluoride, and the like, with a complex of borontrifluoride and tetrahydrofuran being preferred.

According to a preferred embodiment of the present invention, a monoalcohol as hereinabove described is utilized as both an initiator and solvent, i.e., no solvent or a very small amount of a solvent such as dichloroethane is utilized. This preferred route will yield a polyfluorooxetane oligomer such as a homooligomer having a Dp of from about 2 to about 20, desirably from about 2 to about 10, and preferably from about 2 to about 4 with very little cyclic oligomer content as noted above. Such low molecular weight oligomers, e.g. dimers or trimers, are preferred inasmuch as when they are blended or reacted with a coating formulation, they tend to migrate faster to the surface of the blend or coating and give lower surface tensions and thus result in lower coefficient of friction as compared to polyfluorooxetanes having a higher degree of polymerization. While not preferred, polyfluorooxetane polymers or of up to about 50, 100, or 150.

Alternatively, but not preferably copolymers can also be made having a Dp, the polymerization can be carried out in the presence of a Lewis catalyst, as well as a non-initiator or solvent for the fluorooxetane monomer. Examples of suitable non-initiator or non-monoalcohol solvents include trifluorotoluene, dichloroethane, dimethylformamide, as well as dichloromethane. The amount of the alcohol initiator and catalyst for either the above preferred or non-preferred embodiment will generally vary inversely with the desired molecular weight of the polymer. That is, the polymerization is initiated by each alcohol and catalyst molecule generally on a quantitative basis for a given amount of fluorooxetane monomer, hence, the molecular weight of the polyfluorooxetane oligomer or polymer or copolymer will be determined by the amount of alcohol utilized. When this route is utilized, the degree of polymerization (Dp) is also from about 2 to about 20, desirably from about 2 to about 10, and preferably from about 2 to about 4, however, the degree of polymerization can also be up to 50, up to about 100, or even up to about 150.

The reaction rate for forming the polyfluorooxetane oligomer, polymer, or copolymer, utilizing a monoalcohol and a Lewis acid catalyst will vary with temperature. Accordingly, the reaction time is generally from 2 hours to 40 hours, and desirably is from about 4 to about 24 hours. The polymerization temperatures are generally from about 0° C. up to about 100° C., and desirably from about 18° C. to about 50° C. Lower reaction temperatures result in very slow reaction rates, whereas higher reaction temperatures will generally result in the formation of cyclic structures containing from 3 to 4 oxetane units. As noted, monomer conversion to polymer is essentially quantitative. The monohydroxyl polyfluorooxetane oligomers, polymers or copolymers produced are washed with water to obtain a neutral pH and the water removed as by decanting. Subsequently, any suitable desiccant can be utilized such as calcium chloride, phosphorous pentoxide, calcium carbonate, magnesium sulfate, molecular sieves, to dry the oligomers or polymers.

The monofunctional polyfluorooxetane oligomers or polymers generally have the formula

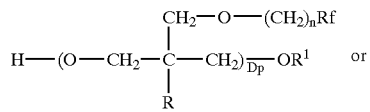

or

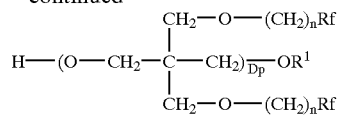

where "n" R, Rf and DP are as described hereinabove and $R^1$ is the organic group of the reactive monoalcohol. That is, $R^1$ is derived from an alcohol as noted above such as an organic alcohol having from 1 to about 40 and preferably from 1 to about 18 carbon atoms, or a polymeric alcohol, etc. If more than one type of monoalcohol is utilized to prepare the polyfluorooxetane oligomers or polymers, naturally the $R^1$ of one or more different polymers, copolymers, or oligomers will be different.

The monofunctional polyoxetane oligomers or polymers can be used in a variety of ways such as surface modifiers, in coatings, in polymer blends and alloys, within interpenetrating polymer networks, as well as in block and graft copolymers.

The fluorooxetane monomers can also be copolymerized with a variety of comonomers having epoxy (oxirane) functionality such as epichlorohydrin, propylene oxide, ethylene oxide, butyl glycidylether, and perfluorooctyl propylene oxide as well as alkyl substituted oxiranes having from 1 to about 15 or from about 7 to about 12 carbon atoms or mixtures thereof; monomers having a 4-membered cyclic ether group such as trimethylene oxide, 3,3-bis(chloromethyl)oxetane, 3,3-bis(bromomethyl)oxetane, and, 3,3-bromomethyl(methyl)oxetane; monomers having a 5 membered cyclic ether group such as tetrahydrofuran, tetrahydropyran, and 2-methyltetrahydrofuran; and the like. Still other suitable monomers include 1,4-dioxane, 1,3-dioxane and 1,3-dioxalane as well as trioxane and caprolactone. The copolymerization reaction is carried out generally under the same conditions as is the polymerization of the fluorooxetane monomers set forth hereinabove. The amount of the comonomer is from about 0.1% to about 99% by weight, desirably from about 1.5% to about 50% by weight, and preferably from about 2% to about 10% by weight based upon the total weight of the one or more comonomers and the fluorooxetane monomers.

A use of the monohydric polyfluorooxetane oligomers, polymers, and copolymers is to functionalize the same with various functional end groups for subsequent use. Such functional end groups include acrylate, methacrylate, allylic, melamine, amine, aceteyl acetate, epoxide, silyl, isocyanate, or derivatives thereof, and the like. Such end groups can be derived from a variety of compounds known to the art and to the literature as set forth in *Principles of Polymerization*, George Odian, Third Edition, published by John Wiley & Sons, Inc., 1991, New York, N.Y. and *Encyclopedia of Chemical Technology*, Kirk-Othmer, Fourth Edition, vols. 1 through 25, published by John Wiley & Sons, 1993, New York, N.Y., the same which are hereby fully incorporated by reference. For example, acrylate end groups can be derived from various acryloly halides such as acryloly chloride, methacrylate end groups can be derived from various methacryloly halides such as methacryloly chloride or from hydroxyl alkyl acrylates or methacryaltes, allylic end groups can be derived from various allylic compounds such as allylchloride, melamine end groups can be derived from various melamine containing compounds or derivatives thereof such as Cymel 303, amine end groups can be derived from the hydrolysis of various isocyanate functional end groups or from various alkylene diamines such as hexamethylene diamine, epoxide end groups can be derived from various epoxy forming or containing compounds such as epichlorohydrin, silyl end groups can be derived from various silyl containing compounds such as chlorotrimethylsilane, and isocyanate end groups can be derived from various diisocyanate compounds such as isophorone diisocyanate.

Hereinafter, the term "functionalized" polyfluorooxetane oligomers, polymers, or copolymers are meant to include end groups such as noted above. The amount of the functionalizing compounds utilized is from about 1.0 to about 1.2, or 1.3, and preferably from about 1.0 to about 1.05 moles based upon one hydroxyl equivalent weight of the polyfluorooxetane. Reaction conditions, procedures, and the like including the use of catalysts, and the like are well known to the literature and to the art as set forth in *Principles of Polymerization*, George Odian, Third Edition, published by John Wiley & Sons, Inc., 1991, New York, N.Y. and *Encyclopedia of Chemical Technology*, Kirk-Othmer, Fourth Edition, vols. 1 through 25, published by John Wiley & Sons, 1993, New York, N.Y., the same which are hereby fully incorporated by reference. Reaction temperatures are generally ambient or higher, i.e. from about 10 to about 120° C.

A preferred route or method of producing the functionalized polyfluorooxetane oligomer, polymer, or copolymer is simply to react, i.e. a direct route, the functionalizing compound directly with the polyfluorooxetane in accordance with the above noted reaction conditions and procedures.

Optionally, but less desirable, the various functionalized polyfluorooxetanes can be produced by reacting the polyfluoroxetane with a coupling agent or compound. Subsequently, a functional compound is added whereby the coupling compound serves as a coupling linkage. Examples of suitable coupling compounds include various diisocyanates, diepoxys, diacids, and the like. When a coupling compound is utilized, it is desirable to sequentially add the reactants so nearly complete functionalization of the polyfluorooxetane can be achieved. Thus an isocyanate or epoxy functionalize polyfluorooxetane is first formed and then reacted with a compound forming a functionalized end group such as a hydroxyl alkyl acrylate, (e.g. hydroxyethyl acrylate) to form a functionalized polyfluorooxetane. In a similar manner, other compounds such as those noted herein above can be utilized to form the above noted functional end group such as methacrylate, allylic, melamine, amine, acetyl acetate, siyl, or derivatives thereof, and the like. Alternatively, the compound forming the functional end group can be reacted with the coupling compound to functionalize the same and the formed compound reacted with the polyfluorooxetane.

The di- or polyisocyanate coupling compound can generally be any compound of the formula R—(NCO)$_y$ where y is an integer equal to or greater than 2 and R is an aliphatic group of 4 to 100 carbon atoms, an aromatic group of 6 to 20 carbon atoms, or a combination of alkyl and aromatic groups or alkyl substituted aromatic or aromatic substituted alkyl of 7 to 30 carbon atoms or oligomers thereof. These isocyanate compounds are well known to the art. Preferred ones are 4',4-methylene diphenyl isocyanate (MDI) as well as polymeric MDI, which is a liquid rather than a crystalline solid, toluene diisocyanate, 1,6-hexane diisocyanate, isophorone diisocyanate (preferred), trimethylhexane diisocyanate, etc.

Similarly the epoxy compounds can generally have the formula

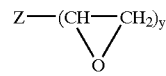

where y is at least 2 and Z is a di or polyvalent group having from 2 to 100 carbon atoms, often 1 or more oxygen atoms, and sometimes other heteroatoms besides oxygen and hydrogen. It is desirable to keep the molecular weight of the epoxy compound low as higher molecular weight materials will increase the viscosity.

Suitable diacids which can be utilized as a coupling agent include the dicarboxylic acids having a total of from 4 to about 12 carbon atoms such as malonic acid, succinic acid, glutaric acid, adipic acid, pimelic acid, maleic acid, fumaric acid, phthalic acid, isophthalic acid, terephthalic acid, and the like.

Concerning the reaction between the hydroxy group of the monohydric polyfluorooxetane oligomer, polymer or copolymer and the coupling compound such as the isocyanate or epoxy group, the same can be monitored by various chemical analysis methods to optimize reaction conditions. Desirably at least about 1.01 moles of a diisocyanate compound, or a diepoxy compound, or a diacid compound, is present for every mole of the polyfluorooxetane compound containing a hydroxyl group. This promotes end capping of the monohydric polyfluorooxetane rather than chain extension. In other words, one isocyanate group of the diisocyante, diepoxy or diacid is reacted with the OH group of the polyoxetane whereas the other remaining group is a free end group which can subsequently be reacted. Thus, the coupling linkage generally contains one reacted isocyanate, epoxy or acid group and one unreacted group. In most embodiments chain extension is not desirable as the resulting higher molecular weight polymers increase the coating viscosity and may decrease the number of load bearing chains, which can decrease physical properties. Other reaction conditions can be optimized to further limit chain extension.

The polyfluorooxetane oligomer, polymer, or copolymer, when incorporated into a coating via the functionalized group, e.g. acrylate, amine, etc., provides improved wear resistance, mar resistance, stain resistance, leveling, improved slip and lower coefficient of friction. There are generally enhanced surface properties relative to a coating without the additive. While not being bound by any explanation, it is thought that the polyfluorooxetane, to the extent possible while blended with the other components and prior to or during the curing process, migrates to the interfaces between the coating and the substrate and the interface between the coating and the atmosphere providing increased wetting at the solid interface improving adhesion, and lowering the surface tension at the atmosphere interface improving leveling, providing improved surfaces (gloss/appearance) at the atmosphere interface, and improved wear and stain resistance at the atmosphere interface. The oligomers, polymers, copolymers, etc. can also be utilized to form molded articles and thick compositions.

Coating compositions include various polymers, copolymers or resins, or monomers or comonomers which form said polymers or co-copolymers, such as vinyl ester resins, polymers made from vinyl aromatic monomers having a total of from 8 to 12 carbon atoms such as styrene, alpha-methyl styrene vinyl toluene, and the like; ethylenically unsaturated monomers generally free of acid groups having from 4 to 30 carbon atoms including alkyl acrylates or alkyl methacryaltes wherein the alkyl group has from 1 to 20 or 27 carbon atoms such as methyl(meth)acrylate, ethyl (meth)acrylate, propyl (meth)acrylate; acrylic acid, etc.; various polyesters made from diols having a total of from 2 to about 6 or 8 carbon atoms and various dicarboxylic acids be they aliphatic, aromatic, or combinations thereof, having a total of from 4 to about 12 carbon atoms such as malonic acid, succinic acid, glutaric acid, adipic acid, pimelic acid, maleic acid, fumaric acid, phthalic acid, isophthalic acid, terephthalic acid, and the like; (cyclo)alkyl esters of maleic acid, fumaric acid and itaconic acid, for example dimethyl maleate, diethyl maleate, diethyl fumarate, dipropyl maleate, dibutyl maleate and dibutyl fumarate; (meth) acrylates containing ether groups, for example 2-methoxyethyl (meth)acrylate, 2-ethoxyethyl (meth) acrylate and 3-methoxypropyl (meth)acrylate; hydroxyalkyl (meth)acrylates having a total of from about 4 or about 7 to about 20 or 30 carbon atoms, for example 2-hydroxyethyl (meth)acrylate, and 2-hydroxypropyl (meth)acrylate; hydroxypolypropylene glycol (meth)acrylates, and the like; N-vinyl pyrrolidone; various conjugated dienes having from 4 to 10 carbon atoms such as butadiene, isoprene, and the like; various urethane acrylates made utilizing the above one or more acrylates, for example a hydroxyl alkyl acrylate with conventional poly or diisocyanates as set forth hereinabove, and various epoxy acrylates made from one or more of the above acrylates, for example a hydroxyl alkyl acrylate with the various epoxys as set forth hereinabove, or various polyester acrylates made from one or more of the above acrylates with one or more preformed polyesters or from one or more polyester forming monomers. In the above list, whenever (meth) is utilized, it means that the existence of a methyl group within the compound is optional. The monomer(s) are generally utilized in any desired amount and selected based upon a variety of considerations including volatility, relative health hazards from exposure, their reactivity ratios in copolymerization with the acrylate terminated polymers and oligomers, etc.

The above coatings can be derived from monomers or comonomers, or polymers or copolymers, that is blends, but desirably such monomers or comonomers, etc. which are reacted with the various functionalized polyfluorooxetane oligomers, polymers, or copolymers through the functionalized end group set forth hereinabove. Preferably, the functionalized polyoxetane is reacted with monomers or comonomers (for example, in situ), to form the coating polymer or copolymer, or resin thereof. Reaction conditions, procedures, and the like will vary depending upon the types of monomers or comonomers, or already formed polymers or copolymers, but the same is well known to the art as well as to the literature as set forth in. *Principles of Polymerization*, George Odian, Third Edition, published by John Wiley & Sons, Inc., 1991, New York, N.Y. and *Encyclopedia of Chemical Technology*, Kirk-Othmer, Fourth Edition, vols. 1 through 25, published by John Wiley & Sons, 1993, New York, N.Y., the same which are hereby fully incorporated by reference.

The coating composition of the present invention which can be cured or uncured can comprise a blend, but preferably the reaction product of the functionalized polyfluorooxetane oligomer, polymer, or copolymer; the one or more coating monomers or comonomers forming the resin, polymer, or copolymer thereof; or the already formed one or more polymer or copolymer; optionally a UV initiator, crosslinking agents, and the like. Optionally, the coating can contain additives such as pigments, plasticizers, rheology modifiers etc. While the functionalized polyfluorooxetane oligomer, polymer, or copolymer can be used in any concentration in the coating composition, it is generally effective in an amount of from about 0.05, or from about 0.1, or from about 1 or 3 to about 10, 20 or 30 weight percent based on the total weight of the coating composition.

Laminates are readily made by applying the coating to a substrate containing one or more substrate layers. The substrates for the curable coating include thermoplastic or thermoset plastics, paper, metals, fabrics such as polyester, nylon, or polyolefin, wovens and nonwovens, cellulosics other than paper, etc. Preferred plastic substrates include polyvinyl chloride, polyolefins, and polyolefin copolymers and blends of polyolefin polymers and copolymers, polyester, polycarbonates, and the like (surface treated or untreated). The plastics may be formed into furniture, cabinets, flooring overlay, building products, etc. Preferred cellulosics include wood products such as furniture, cabinets, wood flooring, paper, and the like. The coating is useful as a protective coating for any of the above substrates.

The coating can be modified to be flexible or rigid depending on the flexibility of the substrate. The polarity of the coating can be adjusted by changing the polarity of the acrylate, or methacrylate, or allylic, terminated components or the monomer to make it compatible with the substrate. The coating can be made more flexible by using less crosslinking agents or choosing a comonomer that forms a lower glass transition temperature polymer. The backbone of a polyfunctional crosslinking agent polymer can also be chosen to result in a softer lower flexural modulus coating.

Various curing options are available for the coating composition. Ambient temperature or heat can be utilized. Electron beam irradiation can also be used to cure the coatings. If ultraviolet (UV) activated free radical photoinitiators are present, ultraviolet light can activate curing. When UV cure is utilized, the functionalized end groups can be any of those set forth above such as acrylate, methacrylate, allylic, or epoxide, etc. Thermal cure can also be utilized and in this situation the functionalized groups include any of those set forth hereinabove such as melamine, amine, acetylacetate, silyl, isocyanate, and epoxide, etc. Combinations of two curatives of a single type can be used. The amount and types of curatives are well known to the art and literature of radiation and UV curatives such as those noted herein below. The amount of curatives is that which converts at least 50, 75 or 90 or even 100 weight percent of the polymerizable components of the coating into nonextractable gel.

The polymerization conditions for forming the coating composition generally involve heating the functionalized polyfluorooxetane oligomer, polymer, or copolymer with one or more already formed polymers or copolymers or preferably with one or more monomers and reacting the same at an elevated temperature desirably in the presence of an initiator or catalyst, and forming as in situ a coating polymer such as a polyacrylate etc., containing the polyfluorooxetane oligomer, polymer, or copolymer therein.

Crosslinking agents which are utilized in the present invention include various polyfunctional oligomers and polymers (other than the monofunctionalized polyfluorooxetane) utilized in radiation curable coatings. They are characterized by the presence of two or more unsaturated carbon to carbon double bonds that can copolymerize with the comonomer(s). These components are added in effective amounts to change the physical properties of the coatings such as crosslink density, which has an effect on modulus and strength. These reactants contribute significantly to the solvent resistance of the cured coatings as the crosslinks they provide inhibit swelling in common solvents. Examples of such crosslinking agents include Ebecryl 810; TRPGDA, tripropylene glycol diacrylate; and TMPTA, trimethylolpropane triacrylate. Crosslinking agents also include oligomeric polyunsaturated compounds which act not only as crosslinking agents, but also contribute to the overall performance of the UV curable coating. Such coating compounds include acrylated or methacrylated, or allylic functionalized polyesters such as Ebecryl 81, an acrylated polyester; acrylated, or methacrylated, or allylic functionalized urethane acrylics such as Ebecryl 4883, an acrylated aliphatic urethane; acrylated or methacrylated, or allylic functionalized urethane polyesters; acrylated, or methacrylated, or allylic functionalized epoxy; or acrylated or methacrylated, or allylic functionalized epoxy polyesters.

Ultraviolet light (UV) activated curative(s) may be used in the coating in an effective amount to cause polymerization of the comonomer(s) and crosslinking by the polyfunctional oligomer and polymeric crosslinking agents. These curatives may be any chemical compound that can generate free radicals on exposure to ultraviolet radiation. UV activated curatives are set forth in U.S. Pat. Nos. 5,411,996; 4,882,201 and 4,279,717 herein incorporated by reference. Other UV activated curatives such as Cyracure UVR-6110 and Cyracure UVI-6974 used in the examples are commercially available and known to the art. Thermal activators include various peroxides such as benzoyl peroxide, t-butyl peroxypivalate, 2,4-dichloro-benzoyl peroxide, decanoylperoxide, propionyl peroxide, hydroxyheptyl peroxide, cyclohexanone peroxide, 2,5-dimethylhexyl-2,5-di(peroxy-benzoate), t-butyl perbenzoate, dicumyl peroxide, 2,5-dimethyl-2,5-di(t-butylperoxy)hexyne-3, 2,5-di-methyl 2,5-di(t-butylperoxy)hexane, 3,5-dimethyl-2,5-di(benzoyl-peroxy)hexane, di-t-butyl peroxide, p-menthane hydroperoxide, cumene hydroperoxide, 2,5-dimethyl-2,5-di(hydroxperoxy)hexane, t-butyl hydroperoxide, lauroyl peroxide, t-amyl perbenzoate, or mixtures thereof. Preferred organic peroxides include benzoyl peroxide and t-butyl perbenzoate.

Other components of the coating include fillers such as $TiO_2$, and zinc oxide, as well as other pigments and colorants; metallic pigments such as aluminum flakes; antigloss agents such as precipitated and organic silicas; dyes; plasticizers such as ester oils, triglycerides, hydrocarbon oils; calcium carbonate; clay; talc; waxes; flow modifiers such as rheology modifiers, shear thinning agents; accelerators or coinitiators such as amines, and wetting agents and surface modifiers for fillers.

The present invention is further illustrated by the following example which serve to represent, but not to limit the invention. Examples 1 through 3 relate to preparation of monohydric polyfluorooxetane copolymers using a mono alcohol initiator and a different compound as a solvent.

Experimental

EXAMPLE 1

Preparation of Monohydric Polyfluorooxetane Using Benzyl Alcohol Initiator and Dichloromethane Solvent Only glass reactors and condensers were used in this procedure. All glassware and chemicals were dried prior to use. A 10 liter round bottomed flask equipped with a condenser, addition funnel, and rubber septum was charged with 1,763.4 grams of dichoromethane solvent. The catalyst, boron trifluoride-tetrahydrofuran (67.15 grams), and the initiator benzyl alcohol, 129.7 grams, (mono-functional alcohol) were added to the reaction flask. 3-FOX (3,314.7 grams) were added to an addition funnel. 3-FOX monomer can be made in a manner as set forth in U.S. Pat. Nos. 5,650,483; 5,668,250; 5,668,251; or 5,663,289. Approximately one-third of the mixture was added to the round-bottomed flask and allowed to stir for approximately 15 to 30 minutes until the reaction was initiated. The temperature was maintained at a temperature of about 20 to 23° C. The remaining monomer mixture was added dropwise over a four-hour period. The reaction mixture was allowed to stir four hours until the conversion reached 97 to 99.8 percent as measured by 1H-NMR. The reaction mixture was washed with water to a neutral pH, the water was decanted and the product was dried over magnesium sulfate. The remaining solvents were removed at reduced pressure. The weight of the cyclic oligomers formed based upon the total weight of the copolymer was approximately 15% by weight.

EXAMPLE 2

Preparation of Monohydric Polyfluorooxetane Using Trifluoroethanol Initiator and Dichloromethane Solvent Dichloromethane solvent (26.6 g) was introducted into a dry flask under a dry nitrogen purge. $BF_3$-THF (7.57 g) catalysts was then slowly syringed into the flask and the mixture stirred. While stirring, trifluoroethanol (initiator) (13.6 g) was slowly syringed into the reactor. The mixture temperature was then brought to 35° C. and allowed to react for approximately 30 minutes. Fifty grams (50 g) of 3-FOX monomer was then slowly added to the reactor with good stirring and the temperature of mixture monitored. A sample to determine monomer conversion by 1H-NMR spectroscopy was taken shortly after a reaction exotherm is observed. Monomer addition continues at a rate to maintain a reaction temperature between 38 and 40° C. After the monomer addition was complete, the reaction temperature was maintained in the range stated above for about 2 hours, until quantitative conversion (>99.5 mole %) of the monomer was achieved.

The polyether was isolated by diluting the mixture to a total of 1 mL of dichloromethane per gram of 3-FOX monomer. The reactor contents are then transferred to a suitably sized separatory funnel and the solution quenched with 0.43 mL of water per gram of 3-FOX and vigorously shaken. After separation of the phases has occurred, the aqueous layer was removed, tested for pH and discarded. Water (0.85 mL/g 3-FOX) was again added to the funnel and shaken vigorously together with the organic layer. The phases were allowed to separate, the aqueous phase is again tested for pH and discarded.

This process was repeated until the pH of the aqueous phase was at least 5. The organic phase was then subjected to rotating evaporation until all the dichloromethane is gone as measured by NMR. Characterization by proton NMR spectroscopy showed the polyol to have an average degree of polymerization (Dp) of 7.6 and a tetrahydrofuran (THF) comonomer content of 14.3 mole %. The weight of the cyclic oligomers formed based upon the total weight of the copolymer was approximately 15% by weight.

EXAMPLE 3

Preparation of Monohydric Polyfluorooxetane Using Allyl Alcohol Initiator and Dichloromethane Solvent Dichloromethane solvent (26.6 g) was introduced into a dry flask under a dry nitrogen purge. $BF_3$-THF (2.53 g) was then slowly syringed into the flask and the mixture stirred. While stirring, allyl alcohol (initiator) (2.62 g) was slowly syringed into the reactor. The mixture temperature was then brought to 35° C. and allowed to react for approximately 30 minutes. Fifty grams (50 g) of 3-FOX monomers were then slowly added to the reactor with good stirring and the temperature of mixture monitored. A sample to determine monomer conversion by 1H-NMR spectroscopy was taken shortly after a reaction exotherm is observed. Monomer addition continues at a rate to maintain a reaction temperature between 38 and 40° C. After the monomer addition is complete, the reaction temperature was maintained in the range stated above for about 2 hours, until quantitative conversion (>99.5 mole %) of the monomer was achieved.

The polyether was isolated by diluting the mixture to a total of 1 mL of dichloromethane per gram of 3-FOX monomer. The reactor contents are then transferred to a suitably sized separatory funnel and the solution quenched with 0.43 mL of water per gram of 3-FOX and vigorously shaken. After separation of the phases has occurred, the aqueous layer was removed, tested for pH and discarded. Water (0.85 mL/g 3-FOX) was again added to the funnel and shaken vigorously together with the organic layer. The phases were allowed to separate, the aqueous phase was again tested for pH and discarded. This process was repeated until the pH of the aqueous phase was at least 5. The organic phase was then subjected to rotating evaporation until all the dichloromethane was gone as measured by NMR. Characterization by proton NMR spectroscopy showed the polyol to have an average degree of polymerization (Dp) of 8.3 and a tetrahydrofuran (THF) comonomer content of 4.5 mole %. The weight of the cyclic oligomers formed based upon the total weight of the copolymer was approximately 15% by weight.

Examples 4, 5, and 6 and 7 relate to the preparation of monohydric polyfluorooxetane copolymers using the same monoalcohol initiator as a co-initiator solvent and thus no non-mondalcohol solvent was utilized.

EXAMPLE 4

Synthesizing Low MW 3-FOX Oligomer using $CF_3CH_2OH$ as Co-Initiator-Solvent

|  | FW | Moles | Mole Ratio | g | p | ml | g actual |
|---|---|---|---|---|---|---|---|
| 3-FOX | 184.15 | 0.272 | 5.01 | 50.00 | 1.15 | 43.48 | 58.38 |
| $CF_3CH_2OH$ | 100.04 | 0.136 | 2.5 | 13.6 | 1.373 | 9.91 | 9.91 |
| $BF_3THF$ | 139.91 | 0.054 | 1.0 | 7.6 | 1.268 | 5.99 | 7.6 |
| $CF_3CH_2OH$ (Schent) | 100.04 | 0.375 | 6.9 | 69.0 | 1.15 | 60 | 69 |

$$\text{Total} \frac{\text{3-FOX } (CF_3CH_2OH)}{\text{Monomer: initiator}} \rightarrow 1.61:1$$

By using $CF_3CH_2OH$ as the initiator and solvent, very low MW linear oligomers may be formed in high yields without the production of significant amounts of cyclic oligomer. That is, the amount of cyclic oligomer formed was less than 1% by weight based upon the total polyfluorooxetane formed.

Polymer Procedure:

1. Oven dry reactors. Cool under $N_2$ purge.
2. Water content of Fox monomer, initiator, and solvent mixture must be less than 500 ppm
   Use Karl Fisher analysis to determine. Can also dry with 4A molecular sieves.
3. Prepare initiator/catalyst complex in the dry flask with condenser under nitrogen purge at room temperature for 30 mins.
4. Prepare monomer or monomer/solvent solution in another flask or WM jar.
5. Flush micropump with appropriate solvent and set pump rate. Set rate*1.8=delivered rate.
6. Heat catalyst/initiator system to 40c.
7. Start pump. Add monomer solution as fast as possible, keeping temperature below 54c.
8. Let polymer solution stir overnight at 40c.

Workup: (Purification)

1. Transfer polymer solution to a larger jacketed flask if necessary.
2. Dilute polymer solution with 100 ml methylene chloride. Polymer maybe too water soluble to workup without a strong organic solvent.

3. Heat flask to 35c. Heating will help separation of phases.
4. Wash polymer solution and neutralize BF3 with 100 ml 2.5% NaHCO3.
5. Stir 30 minutes and let settle 15 minutes.
6. Transfer to a sep. funnel or pump off water layer.
7. Wash polymer solution again with water at 40c until neutral.
8. Dry polymer solution over Na2SO4 for 20 minutes.
9. Vacuum filter and rinse with methylene chloride.
10. Rotovap off methylene chloride at 35c and then heat to 70c to remove trifluoroethanol.

Apparent DP 3.6 (FOX) by end group analysis
Actually a mixture of linear dimer, trimer: tetromer
A small amount of cyclics
13.8 mole % THF, Theoretical=14.6 mole %

EXAMPLE 5

| Synthesizing Low MW 3-FOX Oligomer using CF3CH2OH as Co-Initiator-Solvents | | | | | | | | | | |
|---|---|---|---|---|---|---|---|---|---|---|
| Substance | Scale (g) | Ratio | Quantity (g) | MW | Eq | mmoles | δ | ml | A Used | D |
| 3-fox Monomer | 50 | 0.741 | 50.00 | 184.15 | 2.0 | 271.52 | 1.15 | | 50.019 | 50.020 |
| Trifluoroethanol, co-initiator solvent | | | 69.00 | 100.04 | 5.07 | 689.72 | 1.185 | 58.2 | 69.011 | 69.030 |
| Trifluoroethanol, co-initiator solvent | | 0.0232 | 13.61 | 100.04 | 1.00 | 136.00 | 1.00 | 13.6 | 13.611 | 13.661 |
| BF3THF, catalyst | | 0.0125 | 7.61 | 139.9 | 0.40 | 54.40 | 1.1 | 6.9 | 7.664 | 7.660 |

The oligomer was prepared and purified in a manner as set forth in Example 4.

The Dp was 1.989 and the amount of cyclic oligomer was less than 1% by weight based upon the total weight of polyfluorooxetane.

EXAMPLE 6

| Synthesizing Low MW 3-FOX Oligomer using CF3CH2OH as Co-Initiator-Solvents | | | | | | | | | |
|---|---|---|---|---|---|---|---|---|---|
| Substance | Scale (g) | Ratio | Quantity (g) | MW | Eq | mmoles | δ | ml | B |
| 5-fox Monomer | 50 | 0.741 | 50.00 | 234.15 | 1.8 | 213.54 | 1.15 | | 50.030 |
| Trifluoroethanol, co-initiator solvent | | | 69.00 | 100.04 | 5.96 | 689.72 | 1.185 | 58.2 | 69.360 |
| Trifluoroethanol, co-initiator solvent | | 0.0232 | 11.58 | 100.04 | 1.00 | 115.77 | 1.00 | 11.6 | 11.625 |
| BF3THF, catalyst | | 0.0125 | 6.48 | 139.9 | 0.40 | 46.31 | 1.1 | 5.9 | 6.504 |

The oligomer was prepared and purified in a manner as set forth in Example 4.

The Dp was 1.838 and the amount of cyclic oligomer was less than 1% by weight based upon the total weight of polyfluorooxetane. 5-FOX is (1,1,1,2,2-pentafluoropropanoxy)methyl oxetane.

EXAMPLE 7

| Synthesizing Low MW 3-FOX Oligomer using CF3CH2OH as Co-Initiator-Solvents | | | | | | | | | |
|---|---|---|---|---|---|---|---|---|---|
| Substance | Scale (g) | Ratio | Quantity (g) | MW | Eq | mmoles | δ | ml | C |
| Zox Monomer | 50 | 0.741 | 50.00 | 532 | 2.0 | 93.98 | 1.15 | | 50.072 |
| Trifluoroethanol, co-initiator solvent | | | 69.00 | 100.04 | 14.68 | 689.72 | 1.185 | 58.2 | 69.215 |
| Trifluoroethanol, co-initiator solvent | | 0.0232 | 4.70 | 100.04 | 1.00 | 46.99 | 1.00 | 4.7 | 4.770 |
| BF3THF, catalyst | | 0.0125 | 2.63 | 139.9 | 0.40 | 18.80 | 1.1 | 2.4 | 2.637 |

The oligomer was prepared and purified in a manner as set forth in Example 4.

The Dp was 1.974 and the amount of cyclic oligomer was less than 1% by weight based upon the total weight of polyfluorooxetane 4. ZOX is a mixture of fluorinated methyl oxetanes wherein Rf is a mixture of methyloxtetanes wherein Rf is from $C_6F_{13}$ to about $C_{16}F_{33}$ As apparent from Examples 4 through 7, the amount of cyclic oligomer formed, when utilizing a monoalcohol as both an initiator and a solvent without any other solvent, was negligible, generally less than 1% by weight, whereas when a different solvent was utilized as set forth in examples 1 through 3, the amount of cyclic oligomer was about 15% by weight.

Example 8 is a control wherein a functionalized polyfluorooxetane was made from a diol initiator.

EXAMPLE 8

(Control) Polyfoxdiurethane Acrylate

A 3-liter, 4-neck round bottom flask fitted with a mechanical stirrer, condenser, and a thermometer was dried under nitrogen and charged with poly-3-FOX diol made in a manner as set forth in U.S. Pat. Nos. 5,650,483; 5,668,250; 5,668,251; and 5,663,289, (405 grams, 0.29 eq) from Example 1 Isopherone diisocyanate (69 grams, 0.61 eq) and dibutyltindilaurate (0.2 gram) were added at room temperature. A mild exotherm resulting in a temperature increase from 26 to 30 C was observed. The resulting mixture was stirred at ambient temperature for one hour and then heated to 65 C for one hour. The mixture was then cooled to 30° C. and 2-hydroxyethyl acrylate (37.4 grams, 0.32 eq.) was added over a thirty-minute period. The mixture was stirred at ambient temperature for 16 hours at which point IR analysis revealed the presence of a strong NCO stretching band at 2270 cm–1. Dibutyltindilaurate catalyst (0.3 grams) was added and the mixture was heated at 60 C for 3 hours and then at ambient temperature for 16 hours. A 50 gram sample of acrylate material was removed. An inhibitor (4-methoxyphenol, 0.47 grams) was added and the mixture was stirred vigorously to disperse the inhibitor. The resulting mixture, a colorless viscous oil, was transferred to disperse the inhibitor. The resulting mixture, a colorless viscous oil, was transferred to a plastic carboy [?] and retained for further use. Overall 505 grams of the copolymer was isolated representing a yield of 98.7%.

Example 9 relates to a functionalized monopolyfluorooxetane made from a monoalcohol in accordance with the present invention.

EXAMPLE 9

Preparation of Poly-FOX Mono-Urethane Acrylate

To a clean dry 500 mL reaction kettle, 13.61 grams of isophorone diisocyanate was added. The reactor was heated to 65° C. and 192.1 grams of poly-3-FOX mono-ol (MOX) from Example 1 and 0.10 grams of dibutyltin-dilaurate was added dropwise over 90 minutes. The reaction was allowed to stir (approximately 4 hours) until an isocyanate value of 0.31 mmol/gram was reached. The reaction mixture was cooled to 50° C. The resulting product is a monofunctional isocyanate capped poly-3-FOX.

The monofunctional isocyanate capped poly-3-FOX reaction mixture was maintained at 50° C.; and 7.51 grams of hydroxyethyl acrylate and 0.08 grams of dibutyl tin dilaurate were added dropwise to the reaction mixture. The reaction was stirred and additional hydroxyethyl acrylate was added as needed until the 2300 cm–1 infrared peak associated with the unreacted isocyanate on the monofunctional isocyanate capped poly-3-FOX had disappeared. 0.20 grams of 4-methoxy phenol were added to the final mixture as an inhibitor.

Preparation of Coating Formulations:

The comonomers and acrylated resins (e.g. Ebecryl 81, Ebecryl 4883, TRPGDA, TMPTA, and N-vinylpyrrolidone) were weighted into a reactor and mixed at 50° C. for 30 minutes. The reactor was cooled to room temperature (approximately 25° C.) while mixing. To the reactor contents were added the acrylated Poly-FOX prepolymer of either Example 8 or 9 in amounts as set forth in Tables 2 and 3, the photoinitiator, and the remaining constituents of the formulation of Table 1 and the system was stirred until complete mixing was achieved (approximately 30 minutes).

Coating formulations were applied to the substrates via gravure cylinder or wire wound rods at a nominal thickness of 1 to 2 mils. The coated substrates were placed on a conveyor at a speed of approximately 20 ft/min through the curing chamber. The mercury lamp emitted a 0.045 J/sq cm dose and a 0.055 W/sq cm intensity in the UVC region as measured by the EIT Powerpuck.

TABLE 1

Coating Formulation

| Component | Weight % |
|---|---|
| Ebecryl 4883, acrylated aliphatic urethane oligomer - coating compound | 36 |
| Ebecryl 81, low viscosity amine modified acrylated polyester oligomer - coating compound | 20 |
| TMPTA, trimethylolpropane triacrylate - cross linker | 5 |
| TRPGDA, tripropylene glycol diacrylate - cross linker | 20 |
| Irgacure 500 - UV activated curative | 6.6 |
| Poly-3-Fox, polyoxetane from 3-(2,2,2-trifluoroethoxylmethyl)-3-methyloxetane - Acrylated MOX | Variable see Tables 2 or 3 |
| NVP, N-vinylpyrrolidone - Reactive Diluent | 8.4 |
| N-MEA, N-methylethylamine - Activator for UV Initiator | 1.8 |

To the base formulation was added either Monofunctional or Di-functional Poly-3-FOX acrylate of either Example 8 or 9. The components of the UV curable coating were blended and mixed for 5 min. The resins were preheated below 45° C. and then applied to laminate paper.

Abrasion Resistance

The abrasion resistance of the coatings was determined using a Taber unit (Model 503) with new CS-17 wheels at a 1000 gram load, per the ASTM D 4060-95 protocol. Taber abrasion was run on 12 mil thick cured samples that were prepared by using a 20 mil bird applicator. A draw down was made on a 12" & 8" wide laminate paper made by The Leneta Company. It was cured at a rate of 30 ft/min using a 200-wt/cm lamp. The cured films were aged 24 hours before testing.

The films were cut and then remounted using a one-sided adhesive. An analytical balance was used to record sample weights. Abrasive paper was used to clean the wheels before each test (15 cycles). After the abrasion test the abraded particles were gently removed from the surface of the sample by using a soft brush. The sample was then re-weighed. The reported Taber wear number is the difference between the initial weight and the final weights in grams. The error in the wear values was +/−0.004 gr.

TABLE 2

Taber Abrasion Data

| Weight % | Monoacrylate Poly-3-FOX (Example 9) | | (Control) Diacrylate Poly-3-FOX (Example 8) | |
|---|---|---|---|---|
| | Wear Number $10^{-3}$ | $10^{-3}$ Standard Deviation | Wear number $10^{-3}$ | $10^{-3}$ Standard Deviation |
| 0 | 59 | 7 | 59 | 7 |
| 0.5 | 38 | 0 | 24 | 4.9 |
| 1 | 27 | 3.5 | 25 | 3.2 |
| 3.1 | 27 | 4.2 | 24 | 3.2 |
| 5 | 32 | 3.8 | 26 | 0.7 |
| 20 | 23 | 1.7 | 22 | 0 |

Coefficient of Friction:
The method: Modified ASTM D 1894-90
(1) Mount a long strip of the sample film, in the path of the sled travel, taut across the stationery table with double-sided adhesive tapes at the two ends of the table. Either the coated or the uncoated side can be facing up, depending on whether the coefficient of friction (COF) of two coated surfaces or one coated surface is desired.
(2) Mount a piece of the sample film (2.5"×2.5") with a piece of double sided adhesive tape of any size smaller than the sled.

TABLE 3

COF of Poly-3-FOX UV Acrylate Coatings on Glass Plates (ASTM D-1894)

| Weight % | Monoacrylate Poly-3-FOX (Example 9) | | CONTROL Diacrylate Poly-3-FOX (Example 8) | |
|---|---|---|---|---|
| | COF | Standard Deviation | COF | Standard Deviation |
| 0 | 0.53 | 0.10 | 0.53 | 0.10 |
| 0.5 | 0.36 | 0.06 | 0.46 | 0.18 |
| 1 | 0.33 | 0.01 | 0.47 | 0.26 |
| 5 | 0.34 | 0.08 | 0.53 | 0.06 |
| 10 | 0.27 | 0.01 | 0.40 | 0.08 |

As apparent from Tables 2 and 3, the functionalized Mono-ol polyfluorooxetane monomers of the present invention have properties at least equal to or better than polyfluorooxetane monomers prepared from a diol initiator.

While in accordance with the patent statutes the best mode and preferred embodiment has been set forth, the scope of the invention is not limited thereto, but rather by the scope of the attached claims.

What is claimed is:

1. A process for forming a monohydric polyfluorooxetane composition, comprising the steps of:
reacting a monoalcohol with a monomer consisting essentially of a fluorooxetane monomer in the presence of a Lewis acid catalyst, and forming an oligomer or homonolymer.

2. A process according to claim 1, wherein said monoalcohol comprises an organic alcohol, a polymeric alcohol, a tetrafluoroethylene based telomer fluoroalcohol, or combinations thereof,
wherein said fluorooxetane monomer has the formula

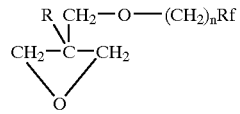

or

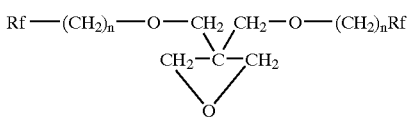

or combinations thereof, where each n is the same or different and independently is an integer from 1 to about 6, R is hydrogen or an alkyl of 1 to 6 carbon atoms, and each Rf is the same or different and independently on each repeat unit is a linear or branched fluorinated alkyl of 1 to 20 carbon atoms, a minimum of 75 percent of the non-carbon atoms of the alkyl being fluorine atoms and optionally the remaining non-carbon atoms being H, I, Cl, or Br; or each Rf is the same or different and independently is a perfluorinated polyether having from 4 to 60 carbon atoms.

3. A process according to claim 2, wherein said organic alcohol has from 1 to 40 carbon atoms, wherein said polymeric alcohol contains repeat units derived from an alkylene oxide having from 2 to 6 carbon atoms wherein the number of repeat groups is from about 3 to about 30, and wherein said tetrafluoroethylene based telomer is $CF_3CF_2(CF_2CF_2)_xCH_2CH_2OH$ where x is from 1 to about 19, and wherein the number of repeat units in said oligomer or opolymer is from 2 to about 150.

4. A process according to claim 3, including conducting said reaction in a solution substantially free of a non-initiator solvent, wherein the number of repeat units in said oligomer or polymer is from about 2 to about 50, wherein each Rf is the same or different and independently is a linear or branch fluorinated alkyl having from 1 to about 15 carbon atoms, wherein said fluorooxetane monomers are polymerized at a temperature of from about 0° C. to about 100° C., wherein in said cationic catalyst is a complex of boron trifluoride-tetrahydrofur-an, and wherein said monoalcohol is benzyl alcohol, trifluoroethanol, allylic alcohol, heptafluorobutanol, pentafluoropropanol, pentafluorobutanol, nona fluorohexanol, various perfluoroalkylethanols, or combinations thereof, and wherein the amount of any non-initiator solvent is about 5% by weight or less based upon the total weight of said non-initiator solvent and said monoalcohol.

5. A process according to claim 4, wherein said fluorooxetane monomer is said

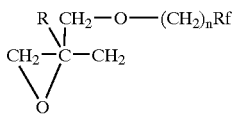

where R is methyl or ethyl, wherein n is 1 to about 3, and wherein Rf contains from 1 to 8 carbon atoms and has at least 85% of the non-carbon atoms being fluorine atoms, and wherein the number of repeat groups of said oligomer or polymer is from about 2 to about 20.

6. A process according to claim 1, wherein said composition contains an amount of cyclic oligomer which is less than about 10% by weight based upon the total weight of said polyfluorooxetane oligomer or polymer.

7. A process according to claim 3, wherein said composition contains an amount of cyclic oligomer which is less than about 5% by weight based upon the total weight of said polyfluorooxetane oligomer or polymer.

8. A process according to claim 5, wherein said composition contains an amount of cyclic oligomer which is less than about 2% or less by weight based upon the total weight of said polyfluorooxetane oligomer or polymer.

9. A process according to claim 1, wherein the step of reacting is performed in the presence of less than about 25 percent by weight non-initiator solvent, based upon the total weight of non-initiator solvent and the monoalcohol.

* * * * *